June 22, 1954 H. W. HEINE 2,681,865
METHOD OF MANUFACTURING GLAZED POROUS CERAMIC TILE
Filed Jan. 28, 1952

INVENTOR
Henry W. Heine.
BY
ATTORNEY

Patented June 22, 1954

2,681,865

UNITED STATES PATENT OFFICE 2,681,865

METHOD OF MANUFACTURING GLAZED POROUS CERAMIC TILE

Henry W. Heine, Washington, D. C.

Application January 28, 1952, Serial No. 268,661

4 Claims. (Cl. 117—8)

This invention relates to ceramic materials and is more particularly concerned with the fabrication and glazing of porous ceramic materials.

In my copending application for patent, Ser. No. 219,510, filed April 5, 1951, I have described a method of manufacturing ceramic construction materials of a very light and highly porous nature. This material and materials of this general type are somewhat frangible, although they are excellent heat and sound insulators. Moreover, sound absorption properties can be further increased by boring holes in the material on the surfaces that are to be exposed to the sound as is well known in the art.

One of the general objects of this invention is the provision of a method for quickly and effectively glazing porous ceramic materials for both ornamental purposes and also for the purpose of enhancing its value as a construction material.

Another general object of the invention is the provision of a method of fabricating sound absorbing blocks from friable porous ceramic tiles in such a way as to eliminate or greatly minimize breakage resulting from the usual drilling procedures and also in handling from manufacture to installation.

A further object of this invention is the provision of a method of glazing ceramic tile of the type mentioned in such a manner as to permit controlling the thickness of the final glaze on the surface thereof.

A still further object is the provision of such a method of glazing in which the control of thickness can be effected with or without changing the composition of the glazing compound applied.

These and other objects and advantages of the invention will be apparent from the following description.

The glazing of ceramic tile is customarily effected by the application to the surface of the material of a glazing composition in the form of either a solid or a thick paste. It is then subjected to fluxing temperatures which causes the glazing compound to melt or flux and then harden. During the fluxing, the thickness of the glaze is established as a function of the surface tension between it and surface of the tile. Accordingly, the thickness of the glaze can only be controlled with a given glazing composition within the limit fixed by the surface tension. The application of additional amounts of the glazing composition, beyond this point is wasteful and will not produce a thicker glaze, because in fluxing the excess will simply run off. In the present invention, the thickness of the glaze can be controlled beyond the surface tension point, because this point has no bearing on or relation to the thickness. Moreover, the control can be effected without waste of the glazing composition because it is carried out in such a way that all the glazing composition applied to the tile is utilized.

An important feature of the present invention resides in the fact that the final glaze forms a mechanical interlock with the ceramic tile at the adjacent interfaces, unlike the usual glazings which form definite planar interfaces and, therefore, are not as secure and are liable to chip.

In general, I have found that ceramic tile of the type mentioned may be glazed by permitting them to absorb in the pores thereof, a liquid solution of the glazing material and subsequently heating it at a relatively low temperature, although higher temperatures may be used if desired. The temperature should be sufficiently high to volatilize the solvent used for the glazing material and to vitrify the material. The heating has the effect of forcing, by exudation, the solution to all exposed surfaces of the tile where vitrification takes place upon volitalization of the solvent. Substantially none of the glaze material remains in the interstices of the tile, as a consequence of which the tile is reconstituted to its original light, porous properties.

In actual practice, I have found that if the tile pieces are soaked in a liquid solution of the glaze material and placed in a furnace, all surfaces will become glazed by extrusion of the composition thereto, except the bottom surface on which it rests in the furnace or any other surface which has been shielded from the direct effects of the heat or temporarily sealed. This bottom or shielded surface is substantially free of any glazing. This has an important advantage, particularly where it is desired to perform a tooling operation on a surface of the tile, because the unglazed surface can be worked in any manner desired, such as by drilling holes in making acoustical blocks, carving ornamental designs, etc., without danger of the frangable block breaking. The partial envelop of glaze holds the block together and keeps it from breaking.

As an illustration, acoustical holes may be bored through the block from the unglazed surface. No special precautions are necessary, because ordinary drills will not affect the glaze on the opposite side. After the holes have been bored, the same or another glazing composition may be applied to the unglazed surface and vitrified by the same or by some other process.

In the accompanying drawing there is illustrated the steps involved in the manufacture of an acoustical tile as explained above, in which.

Figure 1:
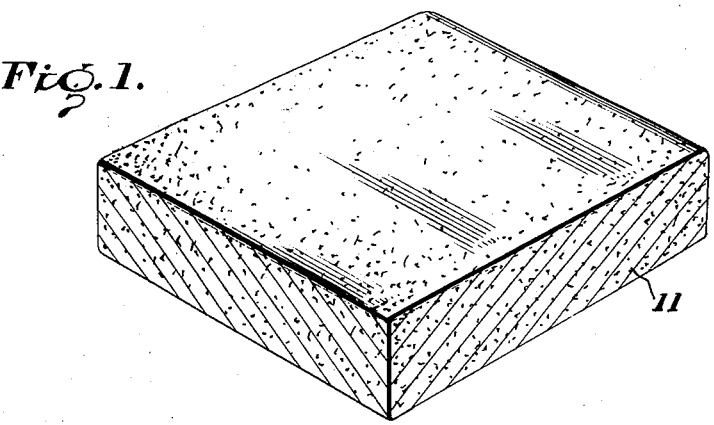
Fig. 1 is a perspective view of the naked ceramic tile.
Figure 2:
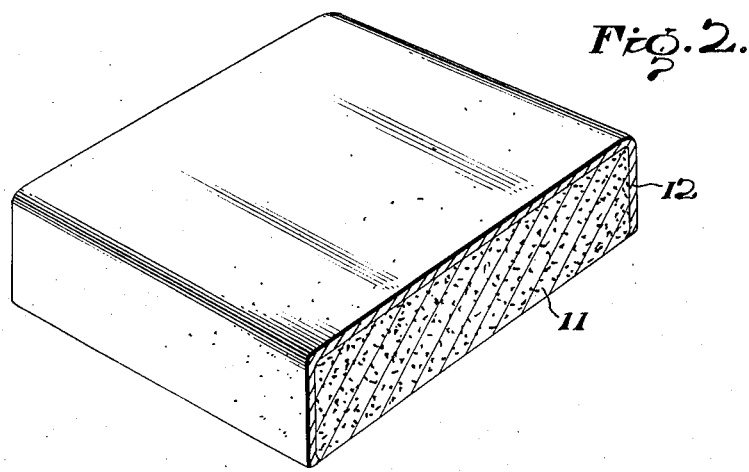
Fig. 2 is a perspective view of the ceramic block after it has been glazed by the method of the present invention on all but one side.
Figures 3, 4:
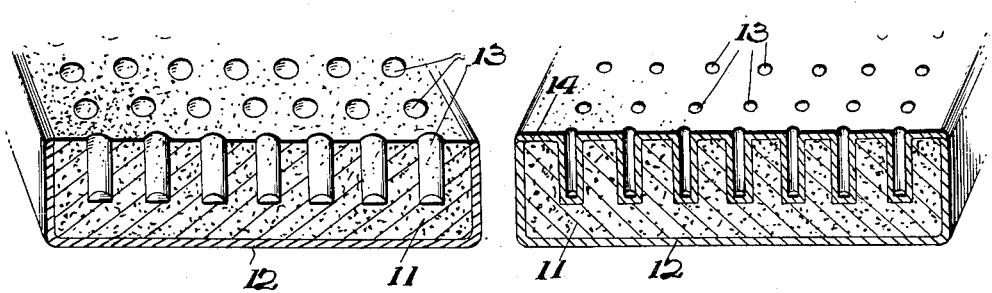
Fig. 3 is a perspective view of the same glazed block, after the acoustical holes have been bored therein.
Fig. 4 is a perspective view of the drilled block after the final glazing has been applied to it.

The ceramic tile itself is, in the drawing, designated by the numeral 11; the first glazing by the numeral 12, the acoustical holes, 13 and the final glaze 14.

It is necessary, in carrying out this invention, for the initial glazing composition to be in the form of a true solution and that the solution be in a fluid state so as to be absorbed by the very fine pores of the ceramic material in the manner of a sponge. Aqueous solutions are preferred, but in the case of some glazing materials which are insoluble in water, other solvents may be such, such as any of the various well known acid solvents. Also the solvents should be volatile so as to volatilize at or below the vitrification temperature, of the particular material being used.

If the solution contains solid particles, they will not exude to the surface, generally, but will become trapped within the interstices of the ceramic material. Consequently, they will not contribute to the surface glazing that will clog the pores of the tile, thereby reducing its porosity. In a vitrified condition, such trapped particles would also interfere with tooling operations, such as drilling. For the latter purpose, it is apparent that the glaze material must be essentially completely removed from the interior of the ceramic tile. However, when the final glazing is applied, after the tool work has been completed, an insoluble glazing material may be applied in whole or as an ingredient of the normal glazing solution, such as in cases where special coloring effects are desired.

Some of the various types of glazing materials which may be used in practicing the invention are aqueous solutions, either concentrated or less than concentrated, of acetate salts of aluminum, barium, sodium, silver, calcium, iron (ferrous and ferric), magnesium, manganese, potassium, and zinc; nitrates and halides (bromides, chlorides, fluorides and iodides) of the same elements; a mineral acid solution of an arsenite of barium, sodium, calcium, iron, manganese, magnesium, silver or zinc; an acid solution of an oxide of aluminum, tin, chromium, cobalt, gold, iron, lead; and other base metal salts. The solubilities of the various known glazing materials are well known and may be determined by reference to any available text.

One of the preferred glazing materials is sodium silicate. The amount of the glazing salt placed in solution is not critical qualitatively, but is a determining factor in the thickness of the final glaze coating. For example, one may use a concentrated solution of borax; or a solution of 1 part sodium silicate and 8 parts water; or a 50% saturated solution of barium acetate; or a 75% saturated solution of cadmium chloride; or a supersaturated solution of magnesium nitrate, etc. By controlling the concentration of the solution used, the thickness of the final glaze can be controlled.

The following example will illustrate further the manner in which the invention may be practiced:

*Example 1*

A porous, frangile ceramic block, 12″ by 12″ by ¾″, was immersed in a tank containing a solution of 1 part sodium silicate in 5 parts water, by weight. Upon emersing the block, it immediately became saturated with the solution and was withdrawn. It was then placed in a furnace with the bottom of the block resting on a horizontal surface. The temperature of the furnace was maintained at 2000 degrees F. for three hours. As the heating proceeded, the solution exuded to the exposed, unshielded surfaces of the block and became vitrified. The block was then removed and permitted to cool. On examination, it was found to contain a clean glaze of about $\frac{1}{16}$″ thick on all sides, except the one upon which the block had rested in the furnace. This side contained no glazing at all.

*Example 2*

The same procedure was followed as in Example 1, except that the concentration of the glaze solution was reduced ½, that is, it now contained 1 part sodium silicate to 10 parts water, by weight. This resulted in a glaze coating of about $\frac{1}{32}$″ thick.

In each case there was a definite demarcation between the glaze and the ceramic block. However, the interface was not smooth, but somewhat irregular suggesting a mechanical interlocking of the surfaces.

I claim:

1. The method comprising soaking a porous, frangible tile in a solution of a heat vitrifiable material, placing the soaked tile in a hot zone, the while shielding a surface thereof, at a temperature above the fluxing point of the material, whereby the material will exude to the unshielded surfaces, exclusive of the shielded surface, and the material will harden thereon, removing the tile from the hot zone and cooling it, then working the shielded surface to delineate a desired design thereon, and finally glazing the said shielded surface.

2. The method of glazing surfaces of baked ceramic tile, said tile having a porous structure, comprising uniformly distributing throughout the porous structure of the tile, a solution of sodium silicate, then heating the tile containing the solution thus distributed at a temperature of about 2000° F., whereby the solution will exude to surfaces of the tile and the sodium silicate will vitrify on the surfaces.

3. A method as defined by claim 2 in which the solution is concentrated to obtain the maximum thickness of glaze.

4. A method as defined by claim 2 in which the solution is dilute to obtain a glaze of less than the maximum thickness.

References Cited in the file of this patent

UNITED STATES PATENTS

| Number | Name | Date |
| --- | --- | --- |
| 617,299 | Purinton | Jan. 3, 1899 |
| 693,420 | Mueller et al. | Feb. 18, 1902 |
| 1,828,767 | Diamond | Oct. 27, 1931 |
| 1,877,481 | Prouty | Sept. 13, 1932 |
| 1,999,371 | Parsons | Apr. 30, 1935 |
| 2,327,076 | Stangle | Aug. 17, 1943 |
| 2,330,129 | Lucas et al. | Sept. 21, 1943 |

FOREIGN PATENTS

| Number | Country | Date |
| --- | --- | --- |
| 14,653 | Great Britain | 1889 |